(12) United States Patent
Ho

(10) Patent No.: US 6,373,216 B1
(45) Date of Patent: Apr. 16, 2002

(54) LCD MOTOR REVERSE DRIVING WITH STORAGE CAPACITORS

(75) Inventor: Chung L. Ho, Arcadia, CA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 09/560,292

(22) Filed: Apr. 27, 2000

(51) Int. Cl.[7] .................................................. G05B 9/02
(52) U.S. Cl. ........................ 318/563; 318/266; 318/286; 318/293; 307/64
(58) Field of Search ................................ 318/159, 160, 318/453, 563, 256, 264, 265, 266, 280, 283, 286, 287, 291, 293, 466, 468; 307/64, 65, 66, 85, 86, 87

(56) References Cited

U.S. PATENT DOCUMENTS

| 5,278,454 A | * | 1/1994 | Strauss et al. ................. 307/64 |
| 5,519,295 A | * | 5/1996 | Jatnieks ....................... 318/453 |
| 5,744,876 A | * | 4/1998 | Fangio ......................... 307/66 |
| 5,744,923 A | * | 4/1998 | Strauss et al. ............... 318/563 |
| 5,833,529 A | * | 11/1998 | Jacob ........................... 454/61 |
| 5,852,333 A | * | 12/1998 | Strojny et al. ................ 307/87 |
| 6,059,260 A | * | 5/2000 | Jacob et al. ................. 251/129 |
| 6,100,655 A | * | 8/2000 | McIntosh ..................... 318/159 |
| 6,250,323 B1 | * | 6/2001 | Genga et al. .................. 137/1 |

* cited by examiner

Primary Examiner—Bentsu Ro
(74) Attorney, Agent, or Firm—Nathan O. Jensen; Kyle Eppele

(57) ABSTRACT

A retractor device for the LCD unit of an on-board entertainment unit is disclosed. The retractor device uses capacitors as storage device to provide electrical energy to drive the retractor motor in the reverse direction in the event of power outage. Under normal operating conditions, the deployment and retraction of the LCD is performed by the motor, with its polarity switched by a relay. At the same time, a storage capacitor is charged up. In the event of power outage while the LCD is in a deployed mode, the energy stored by the capacitor is discharged to drive the motor's retraction mechanism. Blocking diodes may be used on the discharge path to ensure that the discharge path goes toward the motor.

19 Claims, 4 Drawing Sheets

LCD MOTOR REVERSE DRIVING WITH STORAGE CAPACITORS

FIELD OF INVENTION

The present invention relates to on-board entertainment units and more particularly to motors for the deployment and retraction of the overhead monitor units.

ART BACKGROUND

Commercial airlines continuously try to make air travel as enjoyable as possible. One of such efforts is directed at providing in-flight entertainment ("IFE") for passengers individually or as a group broadcast. IFE is conventionally provided by installing liquid-crystal displays ("LCD") for passengers throughout the cabin, either individual or by sections. The individual LCDs allow passengers to watch movies, play video games, do in-flight shopping or simply stay informed. Overhead LCDs are scattered throughout the cabin to provide flight status or news broadcast, since the overhead display of information does not require passengers to retrieve or activate their individual LCDs.

FIG. 1 illustrates a simplified diagram of an overhead LCD in a deployed mode. The LCD 100, shown deployed out of the cavity 110, which is typically built in the overhead storage compartment of an airplane cabin. The LCD 100 is deployed by a motor 120, e.g. direct current ("DC") motor, through its control circuitry 125. When the motor 120 is activated for deployment by the flight attendant, the motor rotates to cause the linkage 135 to push the LCD 100 into a vertical, viewable position.

Under normal circumstances, the LCD 100 can be retracted through the motor 120 for stowage back to the cavity 110. However, for safety reasons, the Federal Aviation Administration ("FAA") regulations mandate that the LCD be retracted even when there is power outage, since the passengers may hit the LCD in case of unexpected turbulence. In some commercial airlines, the LCDs are installed directly above passengers' heads such that their deployment directly gets in the way when passengers stand up.

To address the FAA's mandate of auto-retraction, the conventional approach has been to use a return coil spring 130. When the motor 120 deploys the LCD 100, the return spring 130 is energized such that when there is power outage, the springs 130 can retract the LCD by releasing its stored energy.

FIG. 2 shows a simplified diagram of a conventional motor 220 with the return coil spring 231 in a housing 230. Note that one end of the return spring 231 is attached to the motor shaft at 233, while the other end of the spring is attached to the housing at 232. Thus, as the motor shaft rotates to turn the linkage 235 during deployment, the spring is energized.

As with any mechanical and moving parts, there are problems associated with this approach. First, a spring has a limited life cycle such that after about 2000 uses, the spring needs to be replaced, or at least inspected. And replacing the spring is a tedious and labor intensive task, since one end of the spring is attached to the shaft of the motor and the other end is attached to the housing.

Further, if the motion of retraction is intervened externally, e.g. by a child's hand, the energy previously stored in the spring may cause injury to the child's hand. If the spring is broken, the LCD ends up being stuck in midway, which creates a safety problem in the event of strong turbulence.

In addition to the airline industry, other means of transportation may also encounter this power-off retraction problem.

Therefore, it is desirable to retract the LCD in case of power outage on the airplane in a consistent and reliable manner.

It is also desirable to ensure that the LCD is retracted even after the motion is intervened by external forces such as a passenger's hand.

SUMMARY OF THE PRESENT INVENTION

A retractor device for on-board LCD is disclosed. The retractor device uses capacitors as a storage device to provide electrical energy to drive the retractor motor in the reverse direction in the event of power outage. Under normal operating conditions, the deployment and retraction of the LCD is performed by the motor, with its polarity switched by a relay. At the same time, a storage capacitor is charged up. In the event of power outage while the LCD is in a deployed mode, the energy stored by the capacitor is discharged to drive the motor's retraction mechanism. Blocking devices, such as diodes, may be used to ensure that the discharge path of the storage capacitor goes toward the motor.

The retractor device may further include a secondary capacitor to store electrical energy to be discharged following the discharge of the primary capacitor. By using a damping resistor to cause a slower discharge, the secondary capacitor will ensure that retraction be continued despite any intervention externally. Additional isolation devices, such as diodes, are implemented to prevent the discharge of the primary capacitor into the secondary loop, and vice versa. A voltage maintenance loop, including a diode and a single source power supply, may be included to ensure that the primary storage capacitor is fully charged at all time.

DETAILED DESCRIPTION OF THE PREFERRED EMBODIMENT

A retractor apparatus for in-flight LCD monitor is disclosed. It should be noted that the present invention is described in terms of commonly known components and devices, which are the means generally used by those skilled in the art to communicate with each other. For example, while "diodes" are mentioned in the following description, it should be apparent to those skilled in the art that other current limiting devices, such as generic diodes or rectifiers, can be used to achieve the same functionality. Based on the disclosure of the present application, those skilled in the art can readily implement the present invention, without undue experimentation, for its intended purposes.

Figure 1:
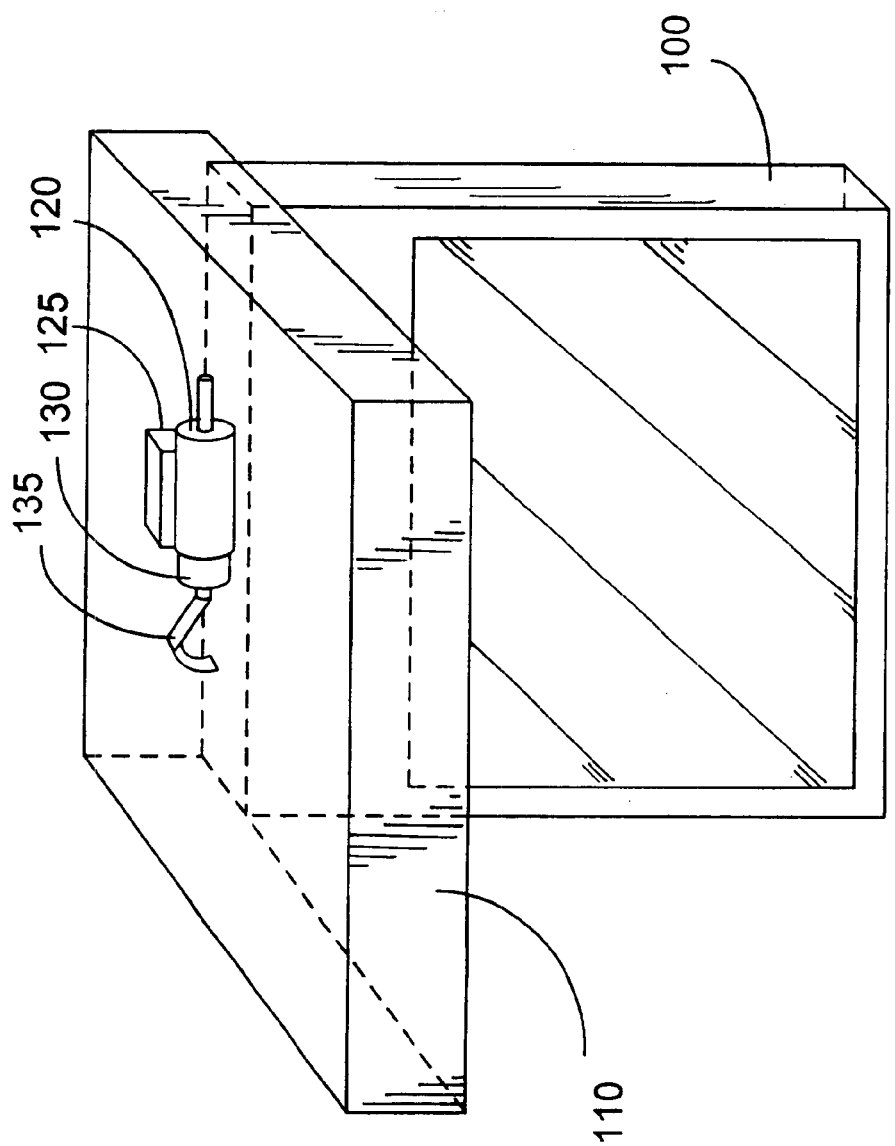
FIG. 1 shows a simplified diagram of the overhead LCD in a deployed mode.
Figure 2:
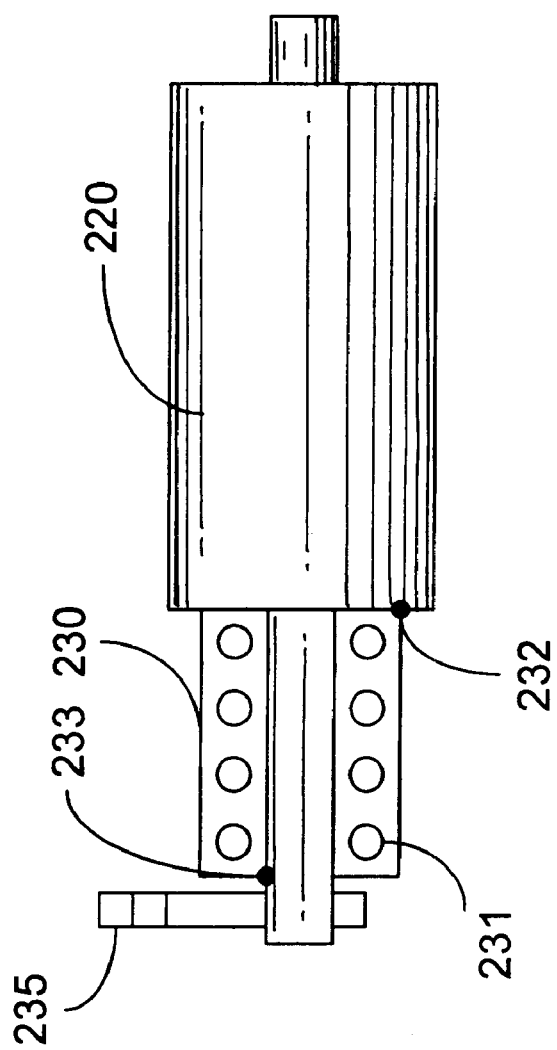
FIG. 2 shows a simplified diagram of a conventional motor with a return coil spring in a housing 230.
Figure 3:
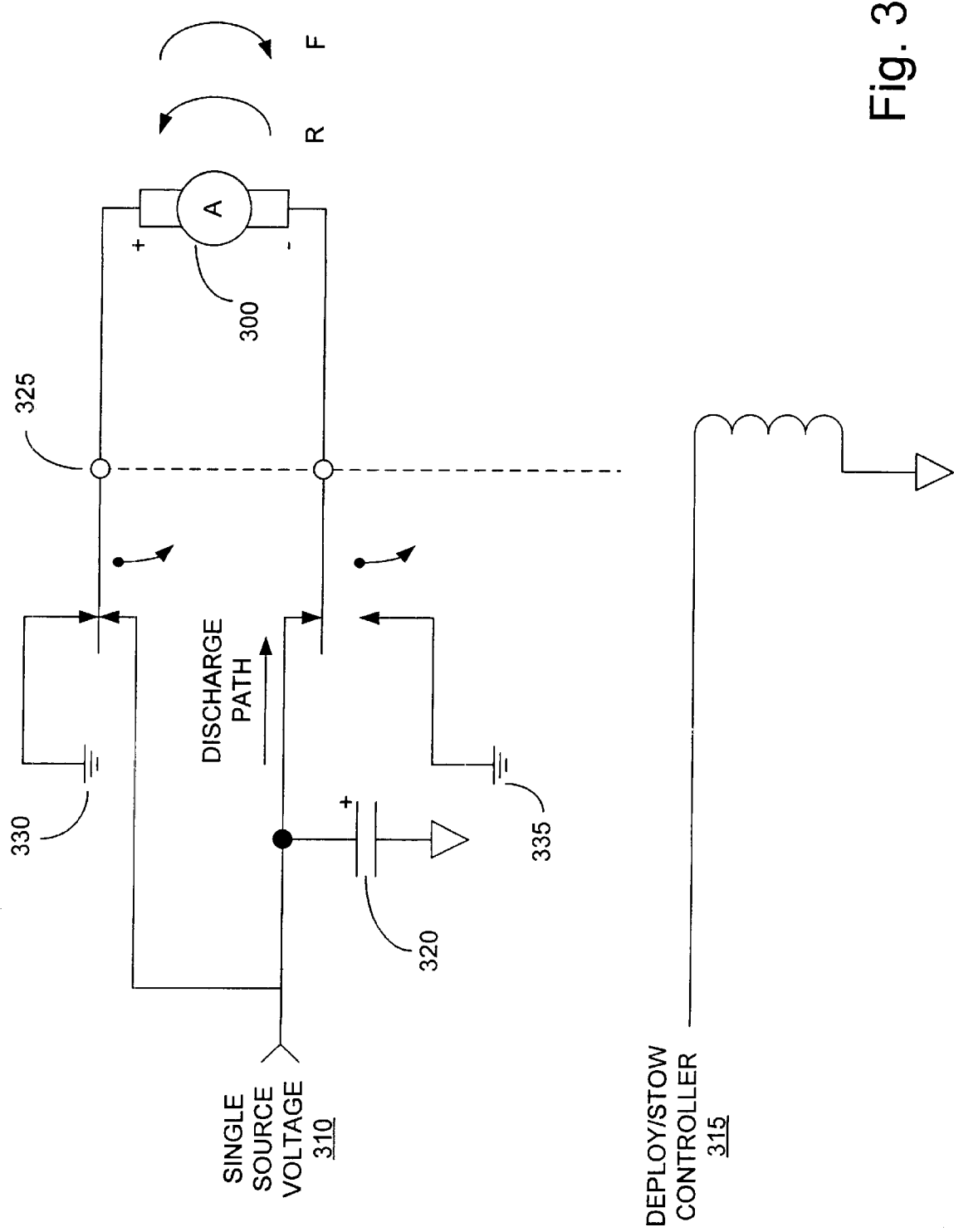
FIG. 3 shows a circuit diagram of the retractor apparatus in a first embodiment in accordance with the present invention.

FIG. 3 shows a circuit diagram of the retractor apparatus in a first embodiment in accordance with the present invention. The circuit comprises a DC motor 300, a direction relay 325 and a storage capacitor 320. The direction relay 325 is normally closed, until it is opened by a controller 315 (Deploy/Stow). A motor ON voltage 310 can be applied to drive the DC motor 300 in a forward direction (current going to ground 335), when the relay 325 is energized by the controller 315 in the Deploy mode. The motor ON voltage 310 is typically 24–28 VDC, depending on the requirements of the DC motor 300.

In a Stow mode, the controller 315 causes the relay 325 to de-energize (open up), thus allowing the motor ON voltage 310 to drive the DC motor 300 in a reverse direction (current going to ground 330) to retract the LCD unit. The relay 325, as can be appreciated by those skilled in the art, can be replaced with a solid-state switch device, for the purpose of switching the polarity on the DC motor 300. At the same time, the storage capacitor 320 is being charged up by the motor ON voltage 310. Preferably, blocking devices, such as diodes, may be placed between the capacitor 320 and the motor ON voltage 310 to prevent the discharge path of the capacitor from going in the wrong direction, i.e. away from the DC motor 300.

Under normal conditions, i.e. no power failure at the motor ON voltage 310, the movement of the LCD unit is controlled by the DC motor 300 and the direction relay 325. However, as mentioned above, FAA regulations require that the LCD be still retracted even when the motor ON voltage 310 is out. In such an event, the energy stored in the capacitor 320 is discharged to drive the DC motor 300 in the reverse direction to retract the LCD unit.

Figure 4:
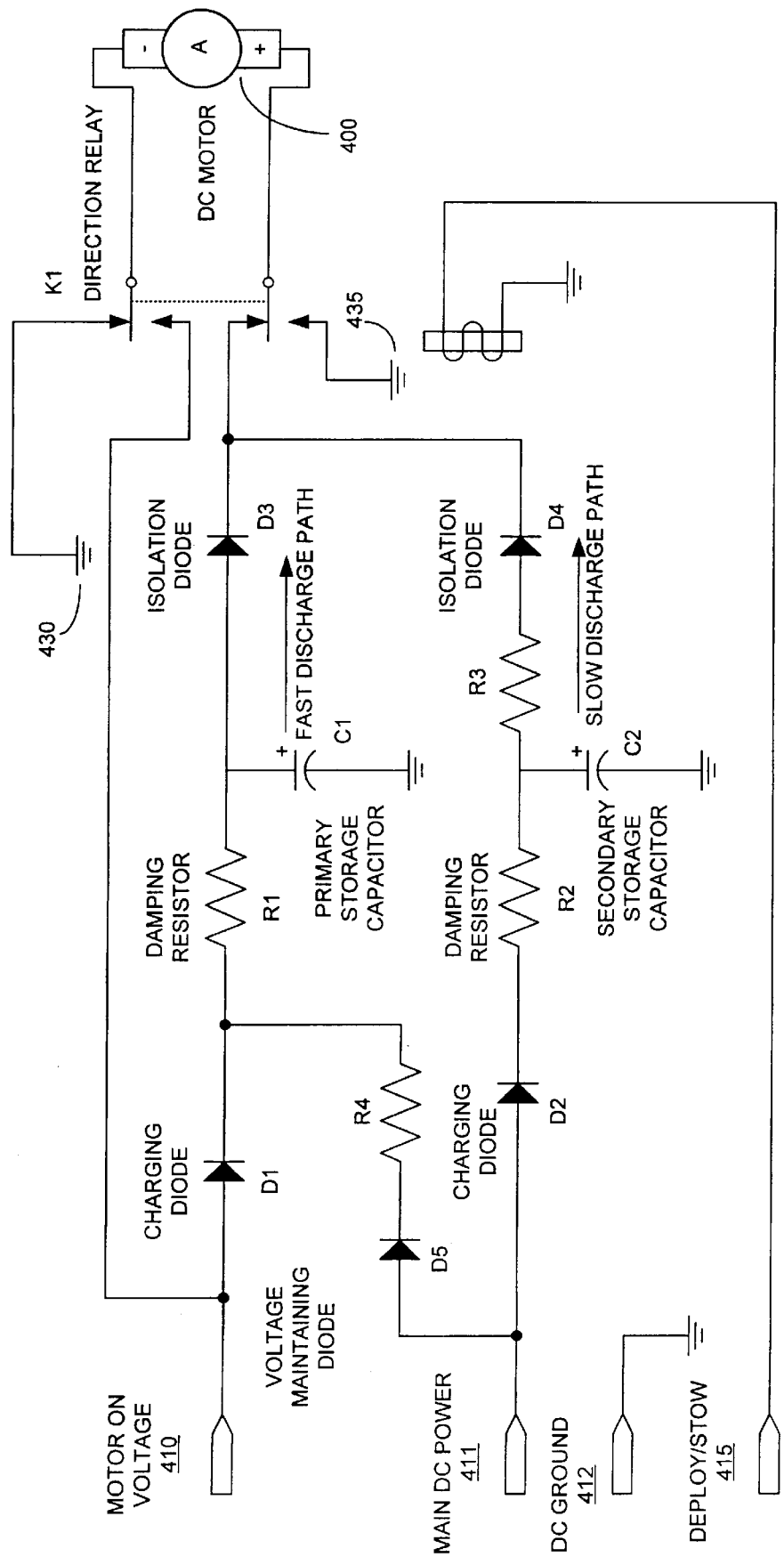
FIG. 4 shows a circuit diagram of the retractor apparatus in another embodiment in accordance with the present invention.

Reference is to FIG. 4, where a circuit diagram of the retractor apparatus in another embodiment in accordance with the present invention is shown. The primary loop, between a motor ON voltage 410 and the direction relay K1, has a charging diode D1, a damping resistor R1, a primary storage capacitor C1, and an isolation diode D3. The secondary loop, between a main DC power 411 and the direction relay K1, has a charging diode D2, a damping resistor R2, a secondary storage capacitor C2, a resistor R3 and an isolation diode D4.

When the controller 415 is in the Deploy mode, it energizes (closes) the direction relay K1, causing the DC motor 400 to be driven by the motor ON voltage 410 in the forward direction. When the controller 415 is in the Stow mode, it de-energizes (opens) the direction relay K1, causing the DC motor 400 to be driven by the energy stored in capacitors C1, C2 and the main DC power 411 in the reverse direction. However, in the event of power outage at the motor ON voltage 410 and the main DC power 411, the primary storage capacitor C1 and the secondary storage capacitor C2 discharge their stored energy to drive the DC motor 400 in the reverse direction.

The charging diodes D1 and D2 and damping resistors R1 and R2 serve to provide a charging path for the capacitors C1 and C2, respectively, as well as prevent the capacitors' discharging away from the DC motor 400.

As shown in FIG. 4, the capacitor C1 can discharge faster than the capacitor C2 due to the presence of the resistor R3. In the event that the primary capacitor C1 runs out of energy to drive the DC motor 400, e.g. the retraction of the LCD unit is interrupted by a child's hand, the secondary storage capacitor can provide the energy. While the capacitor C2 may discharge slower, it is currently implemented to have a bigger capacitance than the capacitor C1, to ensure that the LCD unit is retracted during power outage.

The isolation diode D3 provides isolation in case the capacitor C1 malfunctions and the secondary capacitor C2 has to drive the DC motor 400 on its own. Similarly, the isolation diode D4 provides isolation in case the capacitor C2 malfunctions and the primary capacitor C1 has to drive the DC motor 400 on its own. Even when there is no malfunctioning, the isolation diodes D3 and D4 prevent the discharging by the capacitors C1 and C2 away from the DC motor 400.

Since the main DC power 411 is intended to be on all the time, a voltage maintenance loop may be implemented from the main DC power 411 to the node between the charging diode D1 and the damping resistor R1. This loop has a voltage maintenance diode D5 and a resistor R4 and serves to ensure that the primary storage capacitor C1 remains fully charged even when the motor ON voltage 410 is off.

As can be appreciated by those skilled in the art, the present invention can be applied to on-board display units for automobiles, trains or ships, in addition to airplanes. As telecommunication technology is made more advanced, these means of transportation are getting outfitted with on-board display units for entertainment, web-browsing or broadcasting needs. Just as their airline counterparts, the display units of the systems should have a power-off retraction mechanism. The present invention thus provides an electronic solution to what was conventionally done through mechanical means, i.e. the return springs. As can be appreciated by those skilled in the art, the system in accordance with the present invention provides a reliable and dependable mechanism for on-board display units in the event of power failure.

Obviously, numerous modifications and variations of the present invention are possible in light of the above teachings. It is therefore to be understood that within the scope of the appended claims, the invention may be practiced otherwise than as specifically described herein.

I claim:

1. A system for deploying and retracting an on-board display unit, comprising:

a motor coupled to said display unit, said motor disposed to deploy the display unit in a forward direction, and said motor disposed to retract said display unit in a reverse direction;

a motor voltage source coupled to said motor, said motor voltage source disposed to drive said motor to one of said forward and said reverse directions;

a storage capacitor coupled to said motor voltage source, said storage capacitor disposed to store energy during operation of said motor, said storage capacitor disposed to discharge its energy when said motor voltage source malfunctions to drive said motor in said reverse direction, such that said motor still retracts said display unit in the absence of power from said motor voltage source, and a directional relay coupled to said motor, said directional relay disposed to switch the polarity of said motor between forward-driving and reverse-driving as controlled by said directional relay being in one of an energized and de-energized state, respectively, said directional relay disposed to be normally in said de-energized state in the absence of power from said motor voltage source.

2. A system according to claim 1, further comprising:

a blocking diode coupled between said motor voltage source and said storage capacitor, said blocking diode disposed to prevent said storage capacitor from discharging away from driving said motor.

3. A system according to claim 2, further comprising:
a damping resistor coupled between said motor voltage source and said storage capacitor, said damping resistor disposed to cause a predetermined discharge rate for said storage capacitor.

4. A system according to claim 2, further comprising:
a main DC power source;
a voltage maintenance diode coupled between said main DC power source and said storage capacitor, said voltage maintenance diode disposed to keep said storage capacitor charged up by said main DC power source.

5. A system according to claim 1, further comprising:
a damping resistor coupled between said motor voltage source and said storage capacitor, said damping resistor disposed to cause a predetermined discharge rate for said storage capacitor.

6. A system according to claim 5, further comprising:
a main DC power source;
a voltage maintenance diode coupled between said main DC power source and said storage capacitor, said voltage maintenance diode disposed to keep said storage capacitor charged up by said main DC power source.

7. A system according to claim 1, further comprising:
a main DC power source;
a voltage maintenance diode coupled between said main DC power source and said storage capacitor, said voltage maintenance diode disposed to keep said storage capacitor charged up by said main DC power source.

8. A system for deploying and retracting an in-flight display unit for airplanes, comprising:
a motor coupled to said display unit, said motor disposed to deploy the display unit in a forward direction, and said motor disposed to retract said display unit in a reverse direction;
a motor voltage source coupled to said motor, said motor voltage source disposed to drive said motor to one of said forward and said reverse directions;
a direction controller coupled to said motor, said direction controller disposed to cause said motor voltage source to drive said motor in one of forward and reverse directions;
a primary storage capacitor coupled to said motor voltage source, said primary storage capacitor disposed to store energy during operation of said motor, said primary storage capacitor disposed to discharge its stored energy when said motor voltage source malfunctions to drive said motor in said reverse direction;
a secondary storage capacitor coupled, in parallel, to said primary storage capacitor, said secondary storage capacitor disposed to store energy through a main DC power source, said secondary storage capacitor disposed to discharge its stored energy, at a slower rate, to drive said motor in said reverse direction.

9. A system according to claim 8, wherein said main DC power source is disposed to provide substantially constant power.

10. A system according to claim 9, further comprising:
a primary blocking diode coupled between said motor voltage source and said primary storage capacitor, said primary blocking diode disposed to prevent said primary storage capacitor from discharging away from driving said motor;
a secondary blocking diode coupled between said main DC power source and said secondary storage capacitor, said secondary blocking diode disposed to prevent said secondary storage capacitor from discharging away from driving said motor.

11. A system according to claim 10, further comprising:
a primary damping resistor coupled between said motor voltage source and said primary storage capacitor, said primary damping resistor disposed to cause a predetermined discharge rate for said primary storage capacitor;
a secondary damping resistor coupled between said main DC power source and said secondary storage capacitor, said second damping resistor disposed to cause a slower discharge rate for said secondary storage capacitor.

12. A system according to claim 11, further comprising:
a primary isolation diode coupled between said primary storage capacitor and said second storage capacitor, said primary isolation diode disposed to prevent said secondary storage capacitor from discharging away from said motor;
a secondary isolation diode coupled between said secondary storage capacitor and said primary storage capacitor, said secondary isolation diode disposed to prevent said primary storage capacitor from discharging away from said motor.

13. A system according to claim 10, further comprising:
a primary isolation diode coupled between said primary storage capacitor and said second storage capacitor, said primary isolation diode disposed to prevent said secondary storage capacitor from discharging away from said motor;
a secondary isolation diode coupled between said secondary storage capacitor and said primary storage capacitor, said secondary isolation diode disposed to prevent said primary storage capacitor from discharging away from said motor.

14. A system according to claim 9, further comprising:
a voltage maintenance diode coupled between said main DC power source and said primary storage capacitor, said voltage maintenance diode disposed to keep said primary storage capacitor charged up by said main DC power source.

15. A method of deploying and retracting an on-board display unit through a DC motor, comprising the steps of:
a) applying a first signal to energize a relay, said relay engaging said DC motor in a forward-driving polarity, said relay disposed to engage said DC motor between forward-driving and reverse-driving polarity based on said relay being in one of energized and de-energized states, respectively, said directional relay being disposed to be naturally in said de-energized state in the absence of power;
b) applying a motor voltage source to drive said DC motor in a forward direction, said DC motor deploying said display unit;
c) charging a primary capacitor which is coupled between said motor voltage source and said DC motor;
d) in the event said motor voltage source is not available, discharging said primary capacitor to drive said DC motor in a reverse direction engaged by said relay being in said de-energized state in the absence of power, said reverse direction causing said display unit to retract itself.

16. A method according to claim 15, further comprising a step of blocking said primary capacitor from discharging away from said DC motor by using a diode which is coupled between said motor voltage source and said primary capacitor.

17. A method according to claim 15, further comprising the steps of:
   c-1) charging a secondary capacitor coupled between a main power source and said DC motor;
   c-2) maintaining, in a substantially constant manner, the energy stored by said primary capacitor by using a diode between said main power source and said primary capacitor;
   d-1) discharging said secondary capacitor, in a slower rate, to drive said DC motor in a reverse direction, to ensure that said DC motor causes said display unit to retract itself.

18. A method according to claim 17, further comprising the steps of:
   c-3) preventing discharge of said primary capacitor away from said DC motor by using a primary blocking diode between said primary capacitor and said motor voltage source;
   c-4) preventing discharge of said secondary capacitor away from said DC motor by using a secondary blocking diode between said main power source and said secondary capacitor;
   d-2) preventing discharge of said secondary capacitor to said primary capacitor by using a primary isolation diode between said primary capacitor and said DC motor;
   d-3) preventing discharging of said primary capacitor to said secondary capacitor by using a secondary isolation diode between said secondary capacitor and said DC motor.

19. A method according to claim 18, further comprising the steps of:
   d-4) controlling discharge rate of said primary capacitor by a primary damping resistor in conjunction therewith;
   d-5) controlling discharge rate of said secondary capacitor by using a secondary damping resistor in conjunction therewith.

* * * * *